United States Patent
Villars

(10) Patent No.: US 10,181,050 B2
(45) Date of Patent: Jan. 15, 2019

(54) METHOD AND SYSTEM FOR OBFUSCATION OF GRANULAR DATA WHILE RETAINING DATA PRIVACY

(71) Applicant: MasterCard International Incorporated, Purchase, NY (US)

(72) Inventor: Curtis Villars, Chatham, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 213 days.

(21) Appl. No.: 15/188,274

(22) Filed: Jun. 21, 2016

(65) Prior Publication Data

US 2017/0364705 A1    Dec. 21, 2017

(51) Int. Cl.
| | |
|---|---|
| *G06F 21/62* | (2013.01) |
| *G06F 21/60* | (2013.01) |
| *G06Q 40/00* | (2012.01) |
| *G06Q 10/10* | (2012.01) |

(52) U.S. Cl.
CPC ........ *G06F 21/6227* (2013.01); *G06F 21/606* (2013.01); *G06F 21/6254* (2013.01); *G06Q 10/10* (2013.01); *G06Q 40/12* (2013.12)

(58) Field of Classification Search
CPC ........ G06Q 30/02; G06Q 10/10; G06Q 40/12; G06F 21/6227; G06F 21/606; G06F 21/6254

See application file for complete search history.

(56) References Cited

U.S. PATENT DOCUMENTS

| | | | |
|---|---|---|---|
| 7,200,757 B1 | 4/2007 | Muralidhar | |
| 7,574,570 B2 * | 8/2009 | Gladwin | G06F 21/6227 711/154 |
| 2007/0138265 A1 * | 6/2007 | Powell | G06Q 20/10 235/381 |
| 2009/0307240 A1 * | 12/2009 | Basile | G06Q 20/383 |

(Continued)

OTHER PUBLICATIONS

International Search Report and Written Opinion issued by the International Search Authority dated Aug. 17, 2017 in corresponding PCT Application No. PCT/US2017/035703 (12 pages).

(Continued)

*Primary Examiner* — Chau Le
(74) *Attorney, Agent, or Firm* — Buchanan Ingersoll & Rooney PC

(57) ABSTRACT

A method for obfuscating granular transaction data via the introduction of noise includes: storing transaction data entries, each including transaction data values including at least a transaction amount and merchant identifier; receiving a data request including selection criteria and desired metrics; identifying a subset of transaction data entries based on the selection criteria; identifying a metric value for each desired metric based on the corresponding transaction data value in each of the transaction data entries in the subset; inserting noise to modify the subset by (i) adjusting the transaction data values included in at least two of the transaction data entries, and/or (ii) adding at least one transaction data entry to and removing at least one transaction data entry from the subset, where the inserted noise adjusts the metric values within a predetermined range; and transmitting the modified subset.

16 Claims, 8 Drawing Sheets

(56) References Cited

U.S. PATENT DOCUMENTS

| | | |
|---|---|---|
| 2012/0030165 A1 | 2/2012 | Guirguis |
| 2013/0246125 A1* | 9/2013 | DiGioacchino .... G06Q 30/0201 705/7.33 |
| 2015/0135327 A1* | 5/2015 | Wall .................... G06F 21/6254 726/26 |
| 2016/0140544 A1* | 5/2016 | Howe ................ G06Q 30/0615 705/74 |
| 2017/0300918 A1* | 10/2017 | Bernstein ........... G06Q 20/4016 |
| 2018/0189785 A1* | 7/2018 | Hosp .................... G06Q 20/401 |

OTHER PUBLICATIONS

"Data Sanitization Techniques", Jan. 24, 2009 (Jan. 24, 2009). pp. 1-10, XP055025158, Retrieved from the Internet: URL:http://web.archive.org/web/20090124083826/http://datamasker.com/datasanitizationwhitepaper.pdf.

* cited by examiner

US 10,181,050 B2

METHOD AND SYSTEM FOR OBFUSCATION OF GRANULAR DATA WHILE RETAINING DATA PRIVACY

FIELD

The present disclosure relates to the obfuscation of granular transaction data via the introduction of noise, specifically the injection of noise into transaction data such that the data is useful on a granular level, while retaining privacy of the data for associated entities via use of the injected noise.

BACKGROUND

Granular level data can often be extremely beneficial for use by various entities. However, such data is also often either difficult to obtain, or unable to be shared with an entity due as it can compromise the privacy of individuals or entities to whom the data refers. For example, granular level transaction data for payment transactions, such as going down to the level of individual transactions, may be extremely valuable to merchants, advertisers, retailers, manufacturers, etc. However, such a level of data reveals information about the individuals involved in the transactions, and as such is unavailable to these entities in order to protect the privacy of the involved individuals.

Thus, there is a need for a technical solution to enable the sharing and usage of granular level transaction data with entities that retains the privacy of individuals and entities associated with the transaction data. The obfuscation of the granular level data via the injection of noise into the data may retain the value and usefulness of the data, while also retaining the privacy of the individuals and entities associated with the transactions.

SUMMARY

The present disclosure provides a description of systems and methods for obfuscating granular transaction data via the introduction of noise.

A method for obfuscating granular transaction data via the introduction of noise includes: storing, in a transaction database of a processing server, a plurality of transaction data entries, wherein each transaction data entry is a structured data set configured to store data related to an electronic transaction including at least a primary account number and one or more additional transaction data values where the one or more additional transaction values includes at least a transaction amount and merchant identifier; receiving, by a receiving device of the processing server, a data signal from a computing system superimposed with a data request, wherein the data request includes at least one or more selection criteria and one or more desired metrics where each of the one or more desired metrics corresponds to one of the one or more additional transaction values; executing, by a querying module of the processing server, a query on the transaction database to identify a subset of transaction data entries based on a correspondence between the one or more selection criteria and the one or more additional transaction data values included in each transaction data entry included in the subset; identifying, by an analytic module of the processing server, a metric value for each of the one or more desired metrics based on the corresponding additional transaction value in each of the transaction data entries included in the identified subset; inserting, by a data adjustment module of the processing server, noise to modify the identified subset of transaction data entries by (i) adjusting the primary account number and/or at least one of the one or more additional transaction data values included in at least two of the transaction data entries included in the identified subset, and/or (ii) adding at least one transaction data entry to the identified subset and removing at least one transaction data entry in the identified subset, where the inserted noise adjusts the metric value identified for each of the one or more desired metrics within a predetermined range of the identified metric value; and electronically transmitting, by a transmitting device of the processing server, a data signal superimposed with at least the modified subset of transaction data entries to the computing system.

A system for obfuscating granular transaction data via the introduction of noise includes: a transaction database of a processing server configured to store a plurality of transaction data entries, wherein each transaction data entry is a structured data set configured to store data related to an electronic transaction including at least a primary account number and one or more additional transaction data values where the one or more additional transaction values includes at least a transaction amount and merchant identifier; a receiving device of the processing server configured to receive a data signal from a computing system superimposed with a data request, wherein the data request includes at least one or more selection criteria and one or more desired metrics where each of the one or more desired metrics corresponds to one of the one or more additional transaction values; a querying module of the processing server configured to execute a query on the transaction database to identify a subset of transaction data entries based on a correspondence between the one or more selection criteria and the one or more additional transaction data values included in each transaction data entry included in the subset; an analytic module of the processing server configured to identify a metric value for each of the one or more desired metrics based on the corresponding additional transaction value in each of the transaction data entries included in the identified subset; a data adjustment module of the processing server configured to insert noise to modify the identified subset of transaction data entries by (i) adjusting the primary account number and/or at least one of the one or more additional transaction data values included in at least two of the transaction data entries included in the identified subset, and/or (ii) adding at least one transaction data entry to the identified subset and removing at least one transaction data entry in the identified subset, where the inserted noise adjusts the metric value identified for each of the one or more desired metrics within a predetermined range of the identified metric value; and a transmitting device of the processing server configured to electronically transmit a data signal superimposed with at least the modified subset of transaction data entries to the computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
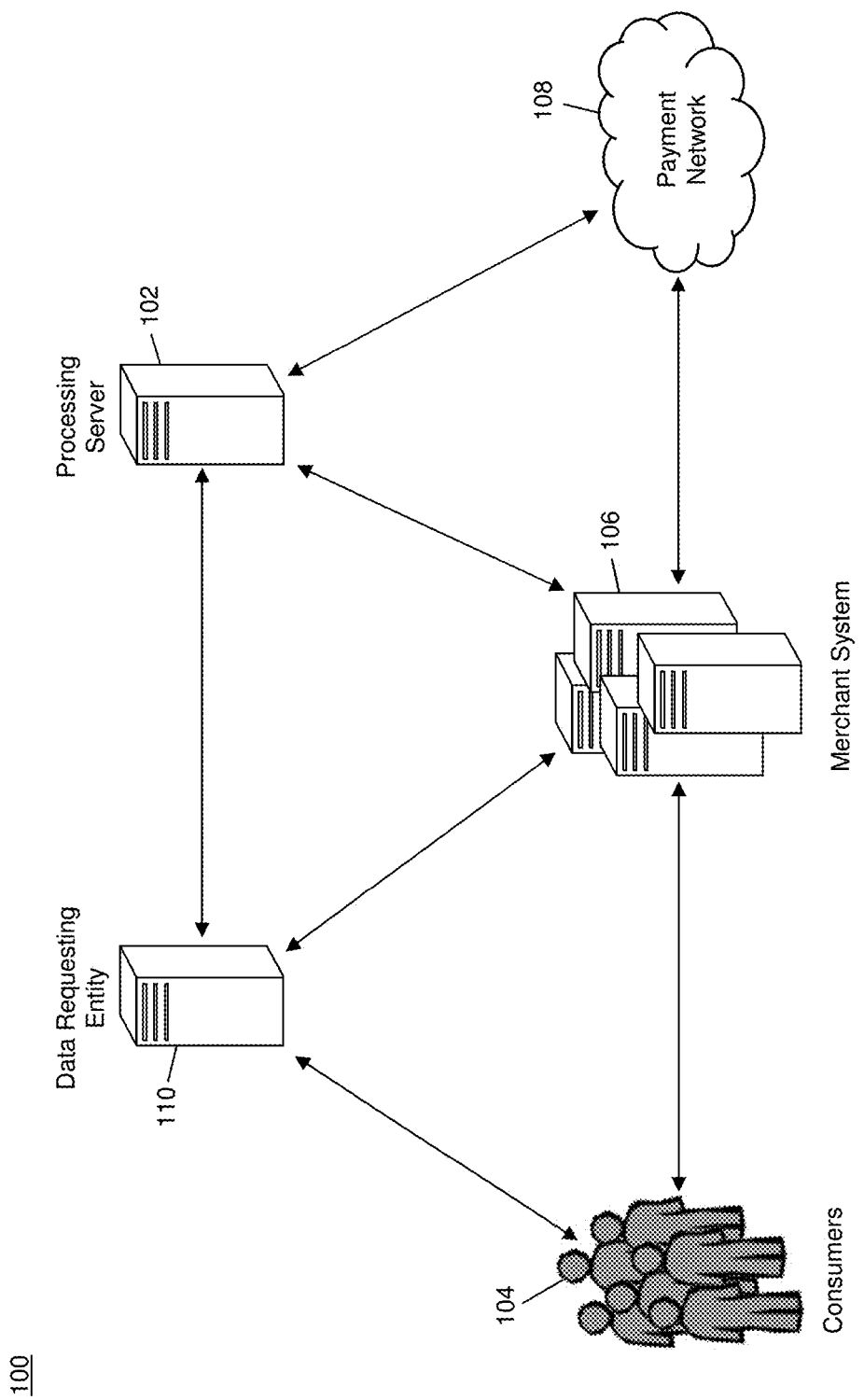
FIG. 1 is a block diagram illustrating a high level system architecture for the obfuscation of granular transaction data via the introduction of noise in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Obfuscation of Granular Transaction Data

FIG. 1 illustrates a system 100 for the obfuscation of granular level transaction data while retaining privacy of individuals and entities associated therewith through the introduction of noise using transaction data values.

The system 100 may include a processing server 102. The processing server 102, discussed in more detail below, may be configured to obfuscate granular transaction data via the introduction of noise therein. The transaction data may be data related to payment transactions involving a plurality of consumers 104. The consumers 104 may conduct a plurality of payment transactions with various merchant systems 106. These payment transactions may be processed via one or more payment networks 108 using traditional methods and systems, such as using the process 700 illustrated in FIG. 7 and discussed in more detail below. The payment networks 108 may electronically transmit the transaction data for the payment transactions to the processing server 102 for the introduction of noise for obfuscation of granular level data. The transaction data may be electronically transmitted via any suitable communication network, such as a local area network, a wireless area network, the Internet, a radio frequency network, etc. In some embodiments, the processing server 102 may be a part of the payment network 108 and may receive the transaction data during processing of the payment transactions by the payment network 108.

The transaction data received by the processing server 102 for the payment transactions may be granular level data such that data values associated with each individual payment transaction are known. The processing server 102 may receive or otherwise parse a plurality of transaction data values for each payment transaction. The transaction data values may include a primary account number associated with a transaction account (e.g., associated with a consumer 104) involved in the respective payment transaction, a transaction amount, a merchant identifier associated with a merchant system 106 involved in the respective payment transaction, a transaction time, transaction date, geographic location, product data, offer data, reward data, loyalty data, consumer data, point of sale data, merchant data, merchant category code, etc. In some embodiments, the payment network 108 may electronically transmit a structured data set related to each payment transaction, with the structured data set including the respective transaction data values. In other embodiments, the payment network 108 may electronically transmit transaction messages to the processing server 102.

Transaction messages may be specially formatted data messages that are formatted pursuant to one or more standards governing the exchange of financial transaction messages, such as the International Organization of Standardization's ISO 8583 standard. Each transaction message may be related to a payment transaction and include a plurality of data elements, where each data element is configured to store a transaction data value. In some instances, a transaction message may include a bitmap, which may indicate the data elements included therein and the transaction data value stored in each respective data element. A transaction message may also include a message type indicator that indicates a type for the transaction message, such as an authorization request, authorization response, clearing record, etc. In some embodiments, transaction messages may be electronically transmitted to the processing server 102 by the payment network 108 using the payment rails. In other embodiments, transaction messages may be electronically transmitted by another suitable communication network configured for the transmission of transaction messages.

The processing server 102 may receive the granular transaction data from the payment network 108 and may store the data in a transaction database included therein, as discussed in more detail below. The system 100 may also include a data requesting entity 110. The data requesting entity 110 may be configured to electronically transmit a data signal to the processing server 102 using a suitable communication network that is superimposed with a request for transaction data. The request for transaction data may include at least one or more selection criteria and one or more desired metrics. Each of the selection criteria and desired metrics may correspond to transaction data values included in transaction data received by the processing server 102. The one or more selection criteria may be used by the processing server 102 in identifying payment transactions that are to be provided to the data requesting entity 110 following obfuscation. For example, the data requesting entity 110 may be a merchant system 106 and may request all transactions involving that merchant system 106, where the selection criteria may include a specific merchant identifier associated with the merchant system 106.

The one or more desired metrics may be used by the processing server 102 for balancing of the transaction data during the introduction of noise to obfuscate the transaction data to retain privacy of the consumers 104 associated therewith. For example, the data requesting entity 110 may indicate transaction amount as a desired metric. The processing server 102 may first determine a metric value for each of the desired metrics using the transaction data prior to obfuscation, for use in balancing of the transaction data. As discussed in more detail below, the processing server 102 may then obfuscate the transaction data (e.g., selected based on the selection criteria, such as all transactions involving a specific merchant system 106) to introduce noise while ensuring that metrics related to the transaction amount remain the same or are within an acceptable range. The acceptable range may be, for instance, five percent of the original transaction amount metric or other value that may be identified by the processing server 102 or data requesting entity 110, which may also be based on the original metric value itself. For instance, a higher value may yield a greater acceptable range.

In one embodiment, the processing server 102 may introduce noise into the transaction data by adjusting one or more transaction data values for at least two payment transactions included therein. For instance, the processing server 102 may increase the transaction amount in a number of payment transactions and may decrease the transaction amount by an equivalent amount for a number of other payment transactions. The number of transactions modified and the amounts of increase or decrease may be selected such that the average transaction amount overall (e.g., as a desired metric indicated by the data requesting entity 110) remains the same or within an acceptable, predetermined range. In another example, the desired metric may include a number of metrics associated with the transaction amount such that the processing server 102 may adjust transaction amounts to ensure that the average transaction amount for each gender, each day of the week, and each hour of the day remains the same or within the acceptable range. In some cases, the processing server 102 may adjust other transaction data values not directly related to the desired metric(s), such as by adjusting a transaction time or transaction date in each payment transaction.

In another embodiment, the processing server 102 may introduce noise into the transaction data by swapping transaction data values for multiple payment transactions. For example, the processing server 102 may swap the primary account number for each payment transaction with the primary account number in another payment transaction such that the other transaction data values included in the payment transaction are not accurate as to the payment transactions conducted by an individual transaction account, such that the activity of that transaction account is unknown. In some cases, the processing server 102 may replace each primary account number included in the identified transaction data with a different identifier such that the real primary account numbers are unavailable. The primary account numbers may be replaced by a proxy identifier generated or otherwise identified by the processing server 102, which may be a random or pseudorandom number, a hash of the original real primary account number, or other suitable value. In such instances, the associated transaction data values may be unable to be tracked back to the original primary account number.

In some embodiments, the processing server 102 may introduce noise into the transaction data by the introduction of generated payment transactions. The generated payment transactions may be "fake" payment transactions that do not involve a real consumer 104 and are not actually processed, but have transaction data that may be included in the transaction data used by the processing server 102 to obfuscate the real payment transactions included in the data provided to the data requesting entity 110. In some instances, the processing server 102 may generate primary account numbers or proxy identifiers for the generated payment transactions, which may not correspond to real transaction accounts. The generated payment transactions may be generated such that the results of the desired metric(s) indicated in the request for transaction data remain the same or are within an acceptable range. In some instances, the processing server 102 may remove one or more real payment transactions from the transaction data as generated payment transactions are introduced, such as to retain the same overall number or frequency of transactions in the data.

Once the transaction data has been obfuscated via the introduction of noise, the processing server 102 may identify a resulting metric value for each of the desired metrics. The processing server 102 may ensure that the resulting metric value matches or is within a predetermined range of the original metric value identified by the processing server 102 for the original transaction data. If the resulting metric value determined using the obfuscated transaction data is outside of the acceptable range, the processing server 102 may continue to introduce noise or adjust introduced noise (e.g., modified transaction data values, generated payment transactions, etc.) until the resulting metric value is within the acceptable range of the original metric value. Once the obfuscated transaction data yields acceptable metric values, the processing server 102 may electronically transmit one or more data signals to the data requesting entity 110 that are superimposed with the obfuscated transaction data.

The data requesting entity 110 may then use the obfuscated transaction data for any suitable purpose, such as offer targeting, determination of advertising effectiveness, design of marketing campaigns, product development, etc. The transaction data may be granular as it may include transaction data values for individual payment transactions, but due to the obfuscation may not be accurate as to the true transaction data or behavior for any individual consumer 104 or entity. As such, it may retain the privacy of the consumers 104 and other transacting entities, while still retaining its usefulness on the granular level as the metric values for the metrics desired by the data requesting entity 110 may be accurate (e.g., to within an acceptable range). The data requesting entity 110 may thus be able to use the transaction data at a granular level, without threatening the privacy or security of the consumers 104.

Processing Server

Figure 2:
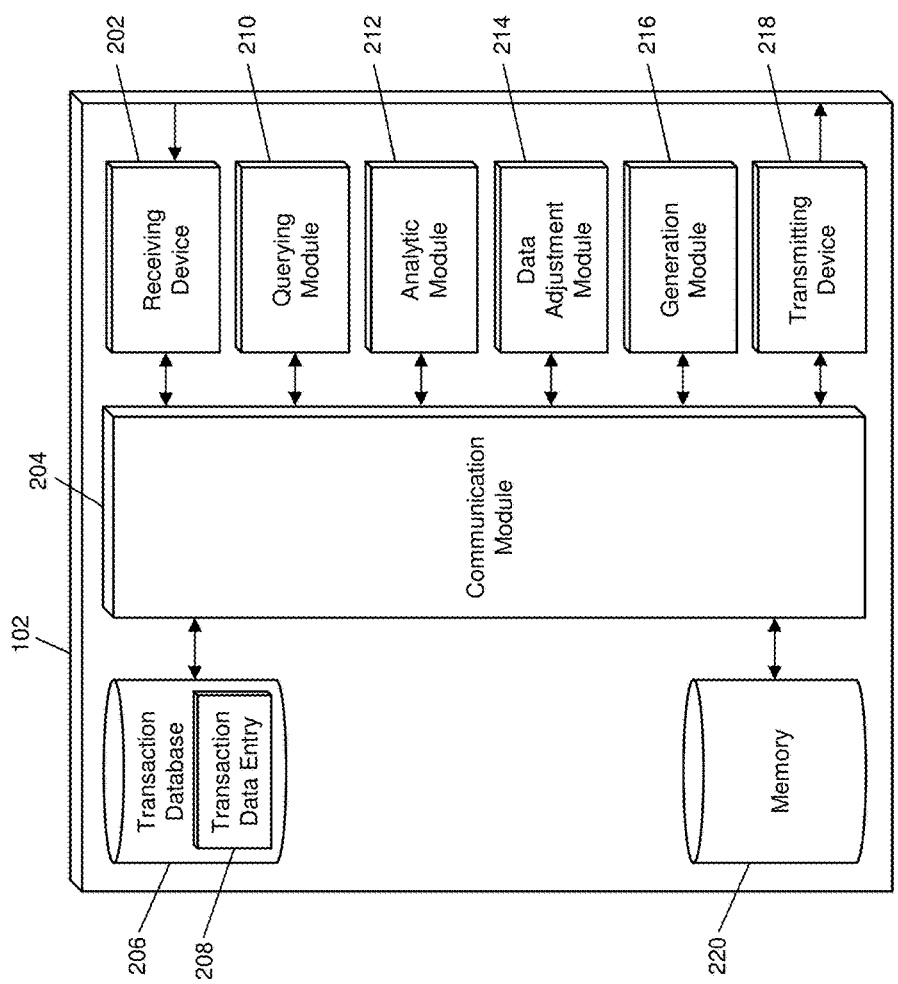
FIG. 2 is a block diagram illustrating the processing server of FIG. 1 for the obfuscation of granular transaction data via the introduction of noise in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 108 for the transmission of transaction messages that include sensitive financial data and information. In some instances, the receiving device 202 may also be configured to receive data from merchant systems 106, payment networks 108, data requesting entities 110, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 108 that are superimposed with transaction data. The transaction data may include structured data sets of transaction data values associated with individual payment transactions. In some instances, the receiving device 202 may receive transaction messages electronically transmitted by payment networks 108. Transaction messages may be formatted pursuant to one or more standards, such as the ISO 8583 standard. The receiving device 202 may also be configured to receive data signals electronically transmitted by data requesting entities 110 or merchant systems 106 that are superimposed with requests for transaction data. A request for transaction data may include one or more selection criteria and one or more desired metrics.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, an analytic module 212, a data adjustment module 214, a generation module 216, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a transaction database 206. The transaction database 206 may be configured to store a plurality of transaction data entries 208 using a suitable data storage format and schema. The transaction database 206 may be a relational database that utilizes structured query language for the storage, identification, modifying, updating, accessing, etc. of structured data sets stored therein. Each transaction data entry 208 may be a structured data set configured to store data related to a payment transaction. Each transaction data entry 208 may include at least a primary account number related to a transaction account involved in the related payment transaction, and one or more additional transaction data values. The additional transaction data values may include at least a transaction amount and a merchant identifier, and may also include additional merchant data, consumer data, transaction time, transaction date, geographic location, etc. In some instances, a transaction data entry 208 more be a transaction message, where the transaction data values may be stored in corresponding data elements included therein.

The processing server 102 may include a querying module 210. The querying module 210 may be configured to execute queries on databases to identify information. The querying module 210 may receive one or more data values or query strings, and may execute a query string based thereon on an indicated database, such as the transaction database 206, to identify information stored therein. The querying module 210 may then output the identified information to an appropriate engine or module of the processing server 102 as necessary. The querying module 210 may, for example, execute a query on the transaction database 206 to identify a plurality of transaction data entries 208 based on the one or more selection criteria included in a received request for transaction data, where the transaction data entries 208 may be identified where a transaction data value includes data indicated in an associated selection criteria.

The processing server 102 may also include an analytic module 212. The analytic module 212 may be configured to identify metric values based on transaction data. The analytic module 212 may receive a plurality of transaction data entries 208, such as identified via the querying module 210, and one or more desired metrics to be analyzed, such as indicated in a received request for transaction data. The analytic module 212 may then identify a metric value for the desired metric based on the corresponding transaction data values included in the transaction data entries 208 and may output the desired metric to another module or engine of the processing server 102 for use thereof. For example, the analytic module 212 may be configured to identify an average transaction amount for a set of transaction data entries 208 based on the transaction amount included in each of the transaction data entries 208. The analytic module 212 may also be configured to identify metric values for transaction data entries 208 that have been obfuscated via the introduction of noise.

The processing server 102 may further include a data adjustment module 214. The data adjustment module 214 may be configured to introduce noise into a set of transaction data entries 208 in order to obfuscate the transaction data included therein. The data adjustment module 214 may receive a set of transaction data entries 208 (e.g., as identified via the querying module 210) and one or more desired metrics (e.g., as indicated in a received request for transaction data) and may then introduce noise into the set of transaction data entries 208 to obfuscate the transaction data on a granular level while retaining an acceptable metric value for the one or more desired metrics. The introduction of noise may include the adjustment of one or more transaction data values, the swapping of one or more transaction data values, the deletion and/or addition of transaction data entries 208 into the set including "fake" generated transaction data entries 208, and other actions as discussed herein. After noise is introduced, the data adjustment module 214 may provide the adjusted transaction data entries 208 to the analytic module 212 for identification of metric values for the adjusted transaction data. The data adjustment module 214 may continue to adjust the transaction data entries 208 until the corresponding metric values identified by the analytic module 212 match or are within an acceptable range of the original metric values for the transaction data entries 208 prior to adjustment.

In some embodiments, the processing server 102 may include a generation module 216. The generation module 216 may be configured to generate data for use in performing the functions of the processing server 102 as discussed herein. The generation module 216 may receive an instruction for the generation of data, which may be accompanied by other data to be used in the generation, may generate the requested data, and may output the generated data to one or more modules or engines of the processing server 102. The generation module 216 may, for example, be configured to generate "fake" primary account numbers, proxy identifiers, hashed account numbers, "fake" transaction data entries 208 and/or transaction messages, etc.

The processing server 102 may also include a transmitting device 218. The transmitting device 218 may be configured to transmit data over one or more networks via one or more network protocols. In some embodiments, the transmitting device 218 may be configured to transmit data over the payment rails, such as using specially configured infrastructure associated with payment networks 108 for the transmission of transaction messages that include sensitive financial data and information, such as identified payment credentials. In some instances, the transmitting device 218 may be configured to transmit data to merchant systems 106, payment networks 108, data requesting entities 110, and other entities via alternative networks, such as the Internet. In some embodiments, the transmitting device 218 may be comprised of multiple devices, such as different transmitting devices for transmitting data over different networks, such as a first transmitting device for transmitting data over the payment rails and a second transmitting device for transmitting data over the Internet. The transmitting device 218 may electronically transmit data signals that have data superimposed that may be parsed by a receiving computing device. In some instances, the transmitting device 218 may include one or more modules for superimposing, encoding, or otherwise formatting data into data signals suitable for transmission.

The transmitting device 218 may be configured to electronically transmit data signals to data requesting entities 110 that are superimposed with adjusted transaction data entries 208. In some embodiments, the transmitting device 208 may also be configured to electronically transmit requests for transaction data to payment networks 108. The requests for transaction data may request transaction data and/or transaction messages from a payment network 108 for storage in the transaction database 206 and use in the introduction of noise for obfuscation of granular transaction data. In some instances, a request may include one or more selection criteria, such as provided by a data requesting entity 110, for the request of transaction data for use in obfuscating transaction data requested by a data requesting entity 110.

The processing server 102 may also include a memory 220. The memory 220 may be configured to store data for use by the processing server 102 in performing the functions discussed herein. The memory 220 may be configured to store data using suitable data formatting methods and schema and may be any suitable type of memory, such as read-only memory, random access memory, etc. The memory 220 may include, for example, currency and geographic location associations, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Process for Obfuscation of Granular Transaction Data

Figure 3:
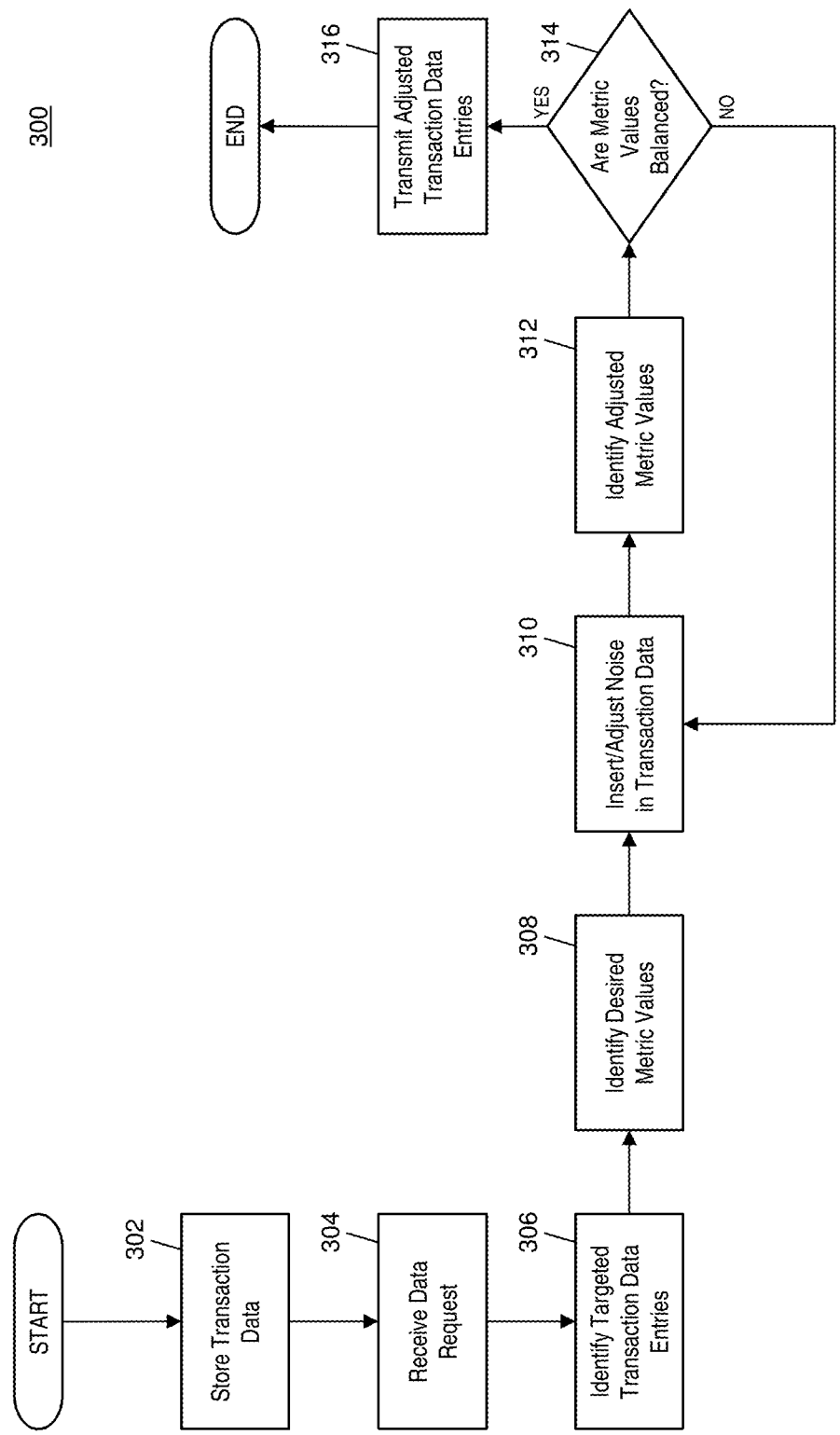
FIG. 3 is a flow diagram illustrating a process for obfuscating granular transaction data via the introduction of noise using the processing server of FIG. 2 in accordance with exemplary embodiments.

FIG. 3 illustrates a process 300 for the obfuscation of granular transaction data via the introduction of noise by the processing server 102 for providing to a data requesting entity 110 while maintaining privacy for consumers 104 involved in the related payment transactions.

In step 302, the processing server 102 may store a plurality of transaction data entries 208 in the transaction database 206 included therein. The transaction data entries 208 may each include a structured data set related to a payment transaction, which may include a plurality of transaction data values received from one or more payment networks 108 for the respective payment transactions. The transaction data values may include at least a primary account number, a transaction amount, and a merchant identifier. In step 304, the receiving device 202 of the processing server 102 may receive a data signal electronically transmitted by a data requesting entity 110 using a suitable communication network and method that is superimposed with a data request. The data request may include at least one or more selection criteria and one or more desired metrics, each of which may be associated with a transaction data value.

In step 306, the querying module 210 of the processing server 102 may execute a query on the transaction database 206 to identify a set of transaction data entries 208 targeted by the data requesting entity. The set of transaction data entries 208 may be identified based on a correspondence between the one or more selection criteria included in the received data request and the corresponding transaction data values included in the respective transaction data entries 208. In step 308, the analytic module 212 of the processing server 102 may identify desired metric values for each of the one or more desired metrics included in the received data request. The desired metric values may be identified based on the data included in the transaction data values associated with each desired metric included in the identified set of transaction data entries 208.

In step 310, the data adjustment module 214 of the processing server 102 may insert noise into the identified set of transaction data entries 208. The insertion of noise may include the adjustment of one or more transaction data values for at least two of the transaction data entries 208, the addition and/or removal of one or more transaction data entries 208, and/or the swapping of transaction data values in at least two of the transaction data entries 208. In some instances, the insertion of noise may also include the replacement of primary account numbers included in one or more of the transaction data entries 208, such as by replacing all of the primary account numbers with proxy identifiers. In some cases, noise may be inserted in a normal distribution. In some instances, a standard deviation for inserted noise may be based on a number of the transaction data entries 208 included in the set. In step 312, the analytic module 212 of the processing server 102 may identify adjusted metric values for each of the one or more desired metrics included in the received data request. The adjusted metric values may be identified based on the data included in the transaction data values associated with each desired metric included in the set of transaction data entries 208 following the insertion of noise by the data adjustment module 214 in step 310.

In step 314, the processing server 102 (e.g., the analytic module 212, data adjustment module 214, or other suitable module or engine included therein) may determine if the desired and adjusted metric values for the set of transaction data entries 208 are balanced. The metric values may be balanced if the adjusted metric value for a desired metric is the same or within a predetermined range of the desired metric value. The predetermined range may be identified by the data requesting entity 110 as included in the receive data request, or may be identified or generated by the processing server 102. For example, in some cases, the predetermined range may be based on the desired metric value, the desired metric, or a number of transaction data entries 208 in the set. If the processing server 102 determines that the adjusted metric values are outside of the acceptable range, the process 300 may return to step 310, where the data adjustment module 214 may continue to insert and/or adjust the noise in the set of transaction data entries 208.

Once the adjusted metric values are balanced with the desired metric values, then, in step 316, the transmitting device 218 of the processing server 102 may electronically transmit one or more data signals to the data requesting entity 110 using a suitable communication network and method that are superimposed with the adjusted set of transaction data entries 208. The data requesting entity 110 may then be free to use the transaction data, including at a granular level, without impinging on the privacy of the consumers 104 and other entities involved in the related payment transactions due to the inserted noise.

Insertion of Noise into Granular Transaction Data

Figure 4:
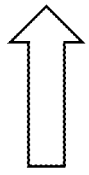
FIG. 4 is a diagram illustrating the obfuscation of granular transaction data via the adjusting of a transaction data value in accordance with exemplary embodiments.

FIG. 4 illustrates the insertion of noise into granular transaction data to obfuscate the transaction data for protection of consumer privacy via the adjustment of transaction data values.

The table 402 illustrates a plurality of transaction data entries 208, where each row in the table 402 includes a plurality of transaction data values related to a single payment transaction, such as may be stored in a transaction data entry 208 in the transaction database 206 of the processing server 102. As illustrated in FIG. 4, the table 402 may include a primary account number (PAN), gender, transaction amount, and transaction data for each transaction data entry 208 included therein.

The table 404 illustrates the set of transaction data entries 208 following the insertion of noise into the set by the data adjustment module 214 of the processing server 102. The insertion of noise includes the adjustment of the transaction amount included in each of the transaction data entries 208 included therein. As illustrated in FIG. 4, the transaction amount in each of the transaction data entries 208 has either been increased or decreased, and by varying amounts. In some embodiments, a normal distribution may be used for the adjustment of transaction amounts. In some cases, a standard deviation for the adjustment may be based on the number of transaction data entries 208. It is noted that, while FIG. 4 illustrates the use of nine transaction data entries 208, the processing server 102 may be configured to perform the functions discussed herein for the insertion of noise for considerably large sets of transaction data entries 208, such as sets numbering in the thousands, millions, or greater.

In the illustrated example, the transaction amount based on gender is used as the desired metric, such as may be indicated by a data requesting entity 110 in a data request received by the receiving device 202 of the processing server 102. As a result, the transaction amounts for each of the transaction data entries have been adjusted such that the average transaction amount for each gender is the same in the adjusted set of transaction data entries 208 included in table 404 as it is in the original set of transaction data entries 208 included in the table 402. In both instances, the metric value for the average transaction amount of males is $6.10, while the metric value for the average transaction amount of females is $7.63. In the illustrated example, the metric value for the average transaction amount for both males and females has also been balanced for each day of transactions, as indicated via the transaction date.

Figure 5:
FIG. 5 is a diagram illustrating the obfuscation of granular transaction data via the swapping of transaction data values in accordance with exemplary embodiments.

FIG. 5 illustrates the insertion of noise into granular transaction data to obfuscate the transaction data for protection of consumer privacy via a combination of noise insertion techniques and methods.

The table 502 illustrates a plurality of transaction data entries 208, where each row in the table 502 includes a plurality of transaction data values related to a single payment transaction, such as may be stored in a transaction data entry 208 in the transaction database 206 of the processing server 102. As illustrated in FIG. 5, the table 502 may include a primary account number (PAN), gender, transaction amount, and transaction data for each transaction data entry 208 included therein.

The table 504 illustrates the set of transaction data entries 208 following the insertion of noise into the set by the data adjustment module 214 of the processing server 102. The insertion of noise includes the use of a plurality of different methods and techniques that may be performed by the data adjustment module 214 as discussed herein. In the table 504, the primary account number for a number of transaction data entries 208 have been swapped, the primary account number for a number of transaction data entries 208 has been replaced by a proxy identifier, and the transaction amount for a number of the transaction data entries 208 has been adjusted.

In the illustrated example, the transaction amount based on gender is again used as the desired metric, such as may be indicated by a data requesting entity 110 in a data request received by the receiving device 202 of the processing server 102. As a result, the noise has been introduced into the transaction data entries 208 in such a way that the average transaction amount for each gender is the same in the adjusted set of transaction data entries 208 included in table 504 as it is in the original set of transaction data entries 208 included in the table 502. In both instances, the metric value for the average transaction amount of males is $6.10, while the metric value for the average transaction amount of females is $7.63. In the illustrated example, the metric value for the average transaction amount for both males and females has also been balanced for each day of transactions, as indicated via the transaction date. The swapping and replacement of the primary account numbers has also been performed, to ensure that transactions may not be traced back to the related transaction account as well.

Figure 6:
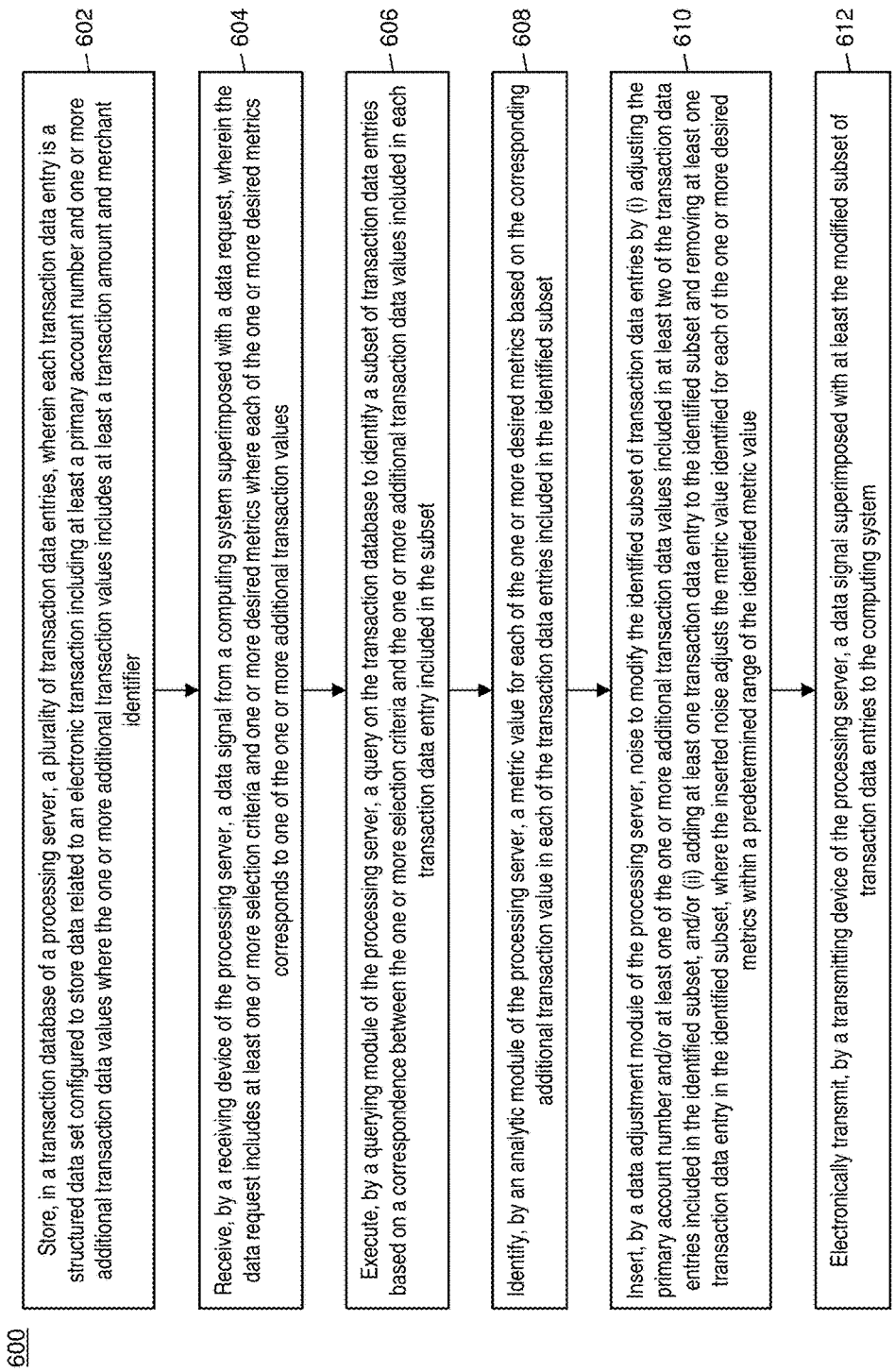
FIG. 6 is a flow chart illustrating an exemplary method for obfuscating granular transaction data via the introduction of noise in accordance with exemplary embodiments.

Exemplary Method for Obfuscating Granular Transaction Data via the Introduction of Noise FIG. 6 illustrates a method 600 for the obfuscation of granular transaction data via the introduction of noise therein.

In step 602, a plurality of transaction data entries (e.g., transaction data entries 208) may be stored in a transaction database (e.g., the transaction database 206) of a processing server (e.g., the processing server 102), wherein each transaction data entry is a structured data set configured to store data related to an electronic transaction including at least a primary account number and one or more additional transaction data values where the one or more additional transaction values includes at least a transaction amount and merchant identifier. In step 604, a data signal may be received by a receiving device (e.g., the receiving device 202) of the processing server from a computing system (e.g., a data requesting entity 110), wherein the data signal is superimposed with a data request, the data request including at least one or more selection criteria and one or more desired metrics where each of the one or more desired metrics corresponds to one of the one or more additional transaction values.

In step 606, a query may be executed on the transaction database by a querying module (e.g., the querying module 210) of the processing server to identify a subset of transaction data entries based on a correspondence between the one or more selection criteria and the one or more additional transaction data values included in each transaction data entry included in the subset. In step 608, a metric value may be identified by an analytic module (e.g., the analytic module 212) of the processing server for each of the one or more desired metrics based on the corresponding additional transaction value in each of the transaction data entries included in the identified subset.

In step 610, a data adjustment module (e.g., the data adjustment module 214) of the processing server may insert noise into the identified subset of transaction data entries to modify the identified subset of transaction data entries by (i) adjusting the primary account number and/or at least one of the one or more additional transaction data values included in at least two of the transaction data entries included in the identified subset, and/or (ii) adding at least one transaction data entry to the identified subset and removing at least one transaction data entry in the identified subset, where the inserted noise adjusts the metric value identified for each of the one or more desired metrics within a predetermined range of the identified metric value. In step 612, a data signal superimposed with at least the modified subset of transaction data entries may be electronically transmitted by a transmitting device (e.g., the transmitting device 218) of the processing server to the computing system.

In one embodiment, adjusting the primary account number and/or at least one of the one or more additional transaction values included in at least two of the transaction data entries included in the identified subset may include subtracting an amount from the transaction amount included in a first transaction data entry and adding the amount to the transaction amount included in a second transaction data entry for one or more pairs of transaction data entries included in the identified subset. In some embodiments, adjusting the primary account number and/or at least one of the one or more additional transaction values included in at least two of the transaction data entries included in the identified subset may include swapping the primary account number included in at least two of the transaction data entries included in the identified subset.

In one embodiment, the method 600 may further include generating, by a generation module (e.g., the generation module 216) of the processing server, a new primary account number, wherein the new primary account number is not included in any transaction data entry included in the identified subset, and adding at least one transaction data entry to the identified subset and removing at least one transaction data entry in the identified subset includes removing two or more transaction data entries included in the identified subset that include different primary account numbers and adding a corresponding number of transaction data entries to the identified subset that include the new primary account number and where the one or more additional transaction data values correspond to the one or more additional transaction values included in the removed two or more transaction data entries. In some embodiments, the predetermined range of the identified metric value may be based on at least one of: the metric value and a number of transaction data entries included in the identified subset.

In one embodiment, the one or more transaction data values may further includes at least one of: geographic location, point of sale identifier, merchant category code, transaction time, transaction date, and product data. In some embodiments, the one or more selection criteria may include at least one of: merchant identifier, transaction time, transaction date, product data, geographic location, merchant category code, point of sale identifier, and transaction amount. In one embodiment, the one or more desired metrics may include at least one of: transaction frequency, average ticket size, number of transactions, number of unique primary account numbers, number of recurring primary account numbers, and a combination thereof. In some embodiments, noise may be inserted in a normal distribution. In a further embodiment, a standard deviation of the inserted noise may be based on a number of transaction data entries included in the identified subset.

Payment Transaction Processing System and Process

Figure 7:
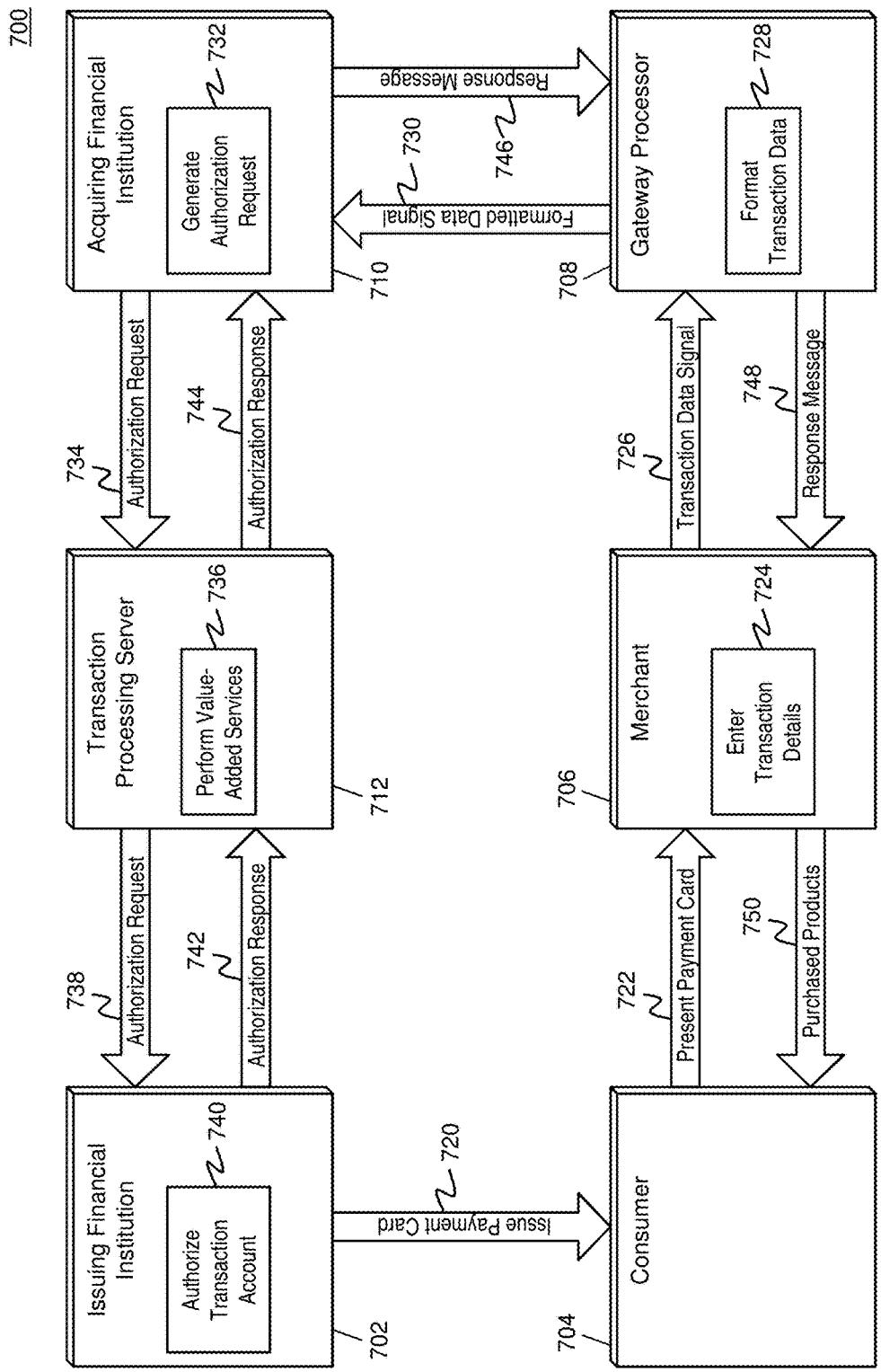
FIG. 7 is a flow diagram illustrating the processing of a payment transaction in accordance with exemplary embodiments.

FIG. 7 illustrates a transaction processing system and a process 700 for the processing of payment transactions in the system. The process 700 and steps included therein may be performed by one or more components of the system 100 discussed above, such as the processing server 102, consumers 104, merchant systems 106, payment networks 108, etc. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3 and 6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 702 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution 710 may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 750, assuming the transaction was approved, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 712. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution 702. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
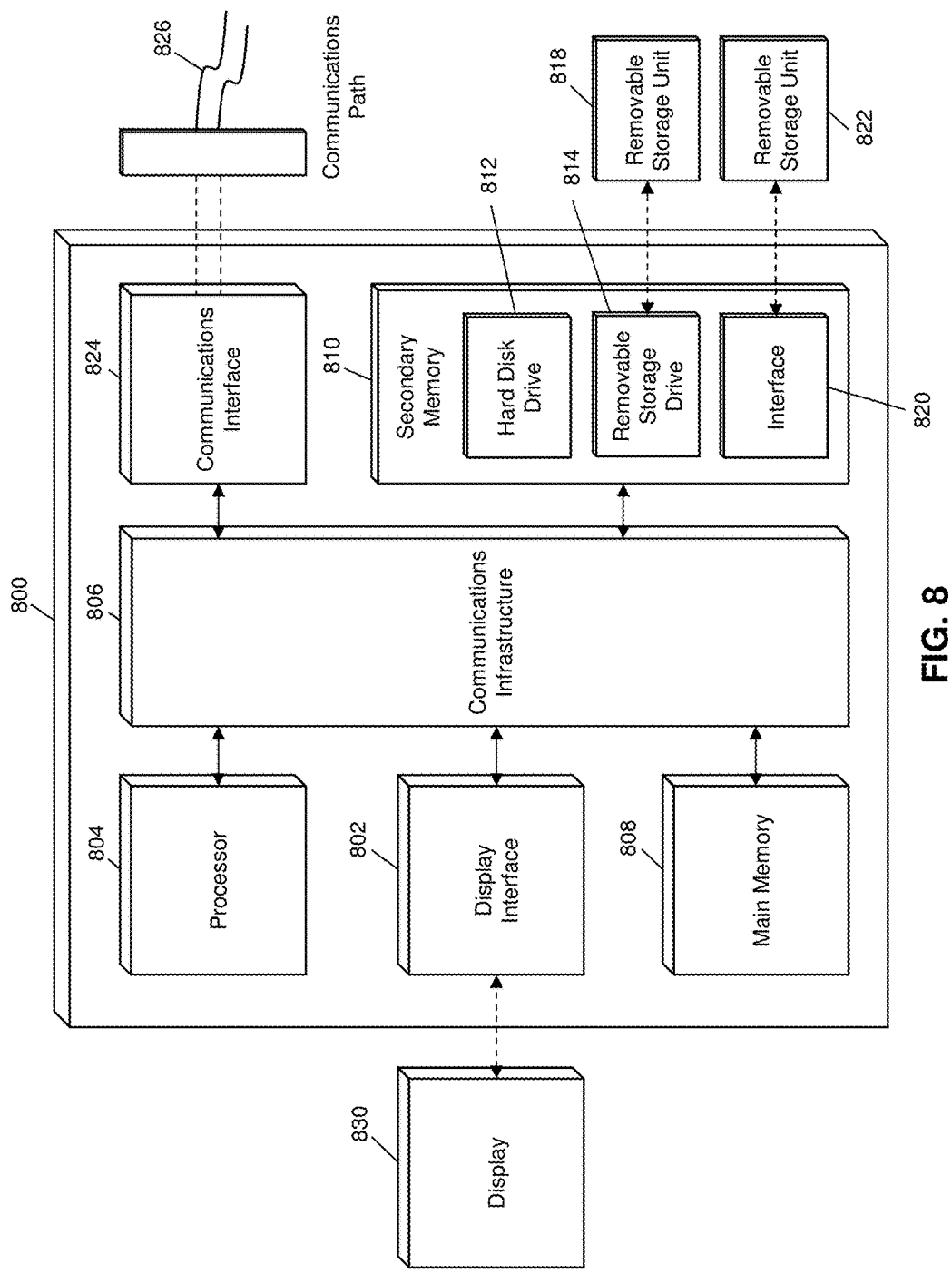
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 6, and 7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3, 6, and 7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for obfuscating granular transaction data via the introduction of noise. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for obfuscating granular transaction data via the introduction of noise, comprising:

storing, in a transaction database of a processing server, a plurality of transaction data entries, wherein each transaction data entry is a structured data set configured to store data related to an electronic transaction including at least a primary account number and one or more additional transaction data values where the one or more additional transaction values includes at least a transaction amount and merchant identifier;

receiving, by a receiving device of the processing server, a data signal from a computing system superimposed with a data request, wherein the data request includes at least one or more selection criteria and one or more desired metrics where each of the one or more desired metrics corresponds to one of the one or more additional transaction values;

executing, by a processing device of the processing server, a query on the transaction database to identify a subset of transaction data entries based on a correspondence between the one or more selection criteria and the one or more additional transaction data values included in each transaction data entry included in the subset;

identifying, by the processing device of the processing server, a metric value for each of the one or more desired metrics based on the corresponding additional transaction value in each of the transaction data entries included in the subset;

inserting, by the processing device of the processing server, noise to modify the subset of transaction data entries to obtain a group of transaction data entries by adding at least one transaction data entry to the subset and removing at least one transaction data entry in the subset, where the inserted noise adjusts the metric value identified for each of the one or more desired metrics within a predetermined range of the identified metric value; and electronically transmitting, by a transmitting device of the processing server, a data signal superimposed with at least the group of transaction data entries to the computing system.

2. The method of claim 1, further comprising:

generating, by the processing device of the processing server, a new primary account number, wherein the new primary account number is not included in any transaction data entry included in the subset, and adding at least one transaction data entry to the subset and removing at least one transaction data entry in the subset includes removing two or more transaction data entries included in the subset that include different primary account numbers and adding a corresponding number of transaction data entries to the subset that include the new primary account number and where the one or more additional transaction data values correspond to the one or more additional transaction values included in the removed two or more transaction data entries.

3. The method of claim 1, wherein the one or more transaction data values further includes at least one of: geographic location, point of sale identifier, merchant category code, transaction time, transaction date, and product data.

4. The method of claim 1, wherein the one or more selection criteria includes at least one of: merchant identifier, transaction time, transaction date, product data, geographic location, merchant category code, point of sale identifier, and transaction amount.

5. The method of claim 1, wherein the one or more desired metrics includes at least one of: transaction frequency, average ticket size, number of transactions, number of unique primary account numbers, number of recurring primary account numbers, and a combination thereof.

6. The method of claim 1, wherein the predetermined range of the identified metric value is based on at least one of: the metric value and a number of transaction data entries included in the subset.

7. The method of claim 1, wherein noise is inserted in a normal distribution.

8. The method of claim 7, wherein a standard deviation of the inserted noise is based on a number of transaction data entries included in the subset.

9. A system for obfuscating granular transaction data via the introduction of noise, comprising:
- a transaction database of a processing server configured to store a plurality of transaction data entries, wherein each transaction data entry is a structured data set configured to store data related to an electronic transaction including at least a primary account number and one or more additional transaction data values where the one or more additional transaction values includes at least a transaction amount and merchant identifier;
- a receiving device of the processing server configured to receive a data signal from a computing system superimposed with a data request, wherein the data request includes at least one or more selection criteria and one or more desired metrics where each of the one or more desired metrics corresponds to one of the one or more additional transaction values;
- a processing device of the processing server configured to
  - execute a query on the transaction database to identify a subset of transaction data entries based on a correspondence between the one or more selection criteria and the one or more additional transaction data values included in each transaction data entry included in the subset;
  - to identify a metric value for each of the one or more desired metrics based on the corresponding additional transaction value in each of the transaction data entries included in the subset; and
  - insert noise to modify the subset of transaction data entries to obtain a group of transaction data entries by adding at least one transaction data entry to the subset and removing at least one transaction data entry in the subset, where the inserted noise adjusts the metric value identified for each of the one or more desired metrics within a predetermined range of the identified metric value; and
- a transmitting device of the processing server configured to electronically transmit a data signal superimposed with at least the group of transaction data entries to the computing system.

10. The system of claim 9, wherein
the processing device of the processing server is further configured to generate a new primary account number,
the new primary account number is not included in any transaction data entry included in the subset, and
adding at least one transaction data entry to the subset and removing at least one transaction data entry in the subset includes removing two or more transaction data entries included in the subset that include different primary account numbers and adding a corresponding number of transaction data entries to the subset that include the new primary account number and where the one or more additional transaction data values correspond to the one or more additional transaction values included in the removed two or more transaction data entries.

11. The system of claim 9, wherein the one or more transaction data values further includes at least one of: geographic location, point of sale identifier, merchant category code, transaction time, transaction date, and product data.

12. The system of claim 9, wherein the one or more selection criteria includes at least one of: merchant identifier, transaction time, transaction date, product data, geographic location, merchant category code, point of sale identifier, and transaction amount.

13. The system of claim 9, wherein the one or more desired metrics includes at least one of: transaction frequency, average ticket size, number of transactions, number of unique primary account numbers, number of recurring primary account numbers, and a combination thereof.

14. The system of claim 9, wherein the predetermined range of the identified metric value is based on at least one of: the metric value and a number of transaction data entries included in the subset.

15. The system of claim 9, wherein noise is inserted in a normal distribution.

16. The system of claim 15, wherein a standard deviation of the inserted noise is based on a number of transaction data entries included in the subset.

* * * * *